US008170944B1

(12) United States Patent
Kruk et al.

(10) Patent No.: US 8,170,944 B1
(45) Date of Patent: May 1, 2012

(54) CUSTOMIZED PERFORMANCE BENCHMARKS FOR STABLE VALUE FUNDS

(75) Inventors: Joshua M. Kruk, Shelburne, VT (US); Matthew G. Gleason, Essex, VT (US); Steven A. Wallace, Hinesburg, VT (US); Jason L. Wyman, Burlington, VT (US)

(73) Assignee: Dwight Asset Management Company LLC, Burlington, VT (US)

( * ) Notice: Subject to any disclaimer, the term of this patent is extended or adjusted under 35 U.S.C. 154(b) by 0 days.

(21) Appl. No.: 13/298,974

(22) Filed: Nov. 17, 2011

(51) Int. Cl.
*G06Q 40/00* (2012.01)

(52) U.S. Cl. .......................................... 705/36 R; 705/4

(58) Field of Classification Search .................. 705/35, 705/36 R, 4
See application file for complete search history.

(56) References Cited

U.S. PATENT DOCUMENTS

| | | | |
|---|---|---|---|
| 7,610,230 | B2 | 10/2009 | Festog et al. |
| 7,698,196 | B1 | 4/2010 | Rouvinez et al. |
| 7,707,093 | B2 | 4/2010 | O'Shaughnessy et al. |
| 7,835,967 | B2 | 11/2010 | Phelps et al. |
| 2005/0033676 | A1 | 2/2005 | Charnley, Jr. |
| 2005/0055295 | A1 | 3/2005 | Bateson et al. |
| 2005/0071263 | A1 | 3/2005 | Janssen |
| 2006/0224487 | A1 | 10/2006 | Galdi |
| 2008/0140584 | A1 | 6/2008 | Hylton |
| 2008/0154790 | A1 | 6/2008 | Hiatt |
| 2009/0048958 | A1 | 2/2009 | Gardner et al. |
| 2009/0192867 | A1 | 7/2009 | Farooq et al. |
| 2009/0271332 | A1 | 10/2009 | Lo et al. |
| 2009/0281958 | A1 | 11/2009 | Abidi et al. |
| 2009/0292563 | A1 | 11/2009 | Michalowski et al. |
| 2011/0060698 | A1 | 3/2011 | O'Flinn et al. |
| 2011/0131069 | A1 | 6/2011 | Koppes et al. |
| 2011/0161246 | A1 | 6/2011 | Gottschalg |
| 2011/0320346 | A1* | 12/2011 | Reichman et al. .......... 705/39 |

OTHER PUBLICATIONS

Fabozzi, Frank J., "The HandBook of Stable Value Investments", 1998. p. 51.*
"Barclays Capital Launches Stable Value Index", Galliard Capital Management, SIMI, Jan. 2011, pp. 7-12.
"Maintaining Stability in Stable Value", Watson Wyatt Worldwide, North America 2009, 15 pages.
Sheng, Ji-liang and Yong-kai Ma, "Study on the Relationship Between Performance and Risk Taking of the Mutual Fund", ICMSE International Conference, Oct. 5-7, 2006, pp. 1588-1592.
Duan, Xinsheng, "Belief Function Model of Private Equity Fund Performance Measurement", IEEE International Conference on May 6-8, 2011, 4 pages.

(Continued)

*Primary Examiner* — Eric T Wong
(74) *Attorney, Agent, or Firm* — Stephen C. Glazier; K&L Gates LLP

(57) ABSTRACT

Embodiments calculate a customized performance benchmark for a stable value fund by incorporating client-specific factors and calculating an overall crediting rate, as if the assets underlying the wrap contracts and insurance separate account contracts were invested in the market indices to which the fund's portfolio strategies are benchmarked, rather than being invested in the actual underlying portfolios of the fund. The resulting benchmark translates market benchmark returns into book value returns and resulting market value to book value ratios, to compare to the actual stable value fund performance. The crediting rate process accounts for the yields, durations, and returns of the market value benchmarks in addition to client-specific cash flows and market value to book value ratios.

15 Claims, 12 Drawing Sheets

OTHER PUBLICATIONS

Xing, Cao and Peng Geng, "Study on the Influence of Benchmark on the Design of Fund Incentive Contract Based on the Effort and Risk Choice of Manager", WiCOM 4th International Conference on Oct. 12-14, 2008, pp. 1-5.

Sirower, Mark L. and Stephen F. O'Byrne, "The Measurement of Post-Acquisition Performance: Toward a Value-Based Benchmarking Methodology", Academy of Management Meetings, Journal of Applied Corporate Finance, 1997, pp. 107-121.

* cited by examiner

| STABLE VALUE FUND RETURNS | MV | BV | RATIO | CREDITING RATE (FOR NEXT MONTH) | MONTHLY BV RETURNS. FOR THE STABLE VALUE FUND, IT IS POSSIBLE TO COMPOUND MONTHLY RETURNS TO CALCULATE AN ANNUAL RETURN. |
|---|---|---|---|---|---|
| 12/31/2009 | 1.000 | 1.000 | 1.000 | 0.045 | 0.367 |
| 1/29/2010 | 0.995 | 1.004 | 0.991 | 0.045 | 0.367 |
| 2/26/2010 | 0.990 | 1.007 | 0.983 | 0.043 | 0.367 |
| 3/31/2010 | 0.985 | 1.011 | 0.974 | 0.040 | 0.349 |
| 4/30/2010 | 0.980 | 1.014 | 0.966 | 0.038 | 0.331 |
| 5/31/2010 | 0.975 | 1.017 | 0.959 | 0.036 | 0.313 |
| 6/30/2010 | 0.970 | 1.020 | 0.951 | 0.034 | 0.296 |
| 7/30/2010 | 0.966 | 1.023 | 0.944 | 0.032 | 0.279 |
| 8/31/2010 | 0.961 | 1.026 | 0.936 | 0.030 | 0.262 |
| 9/30/2010 | 0.956 | 1.028 | 0.929 | 0.028 | 0.246 |
| 10/29/2010 | 0.951 | 1.031 | 0.923 | 0.026 | 0.230 |
| 11/30/2010 | 0.946 | 1.033 | 0.916 | 0.024 | 0.215 |
| 12/31/2010 | 0.942 | 1.035 | 0.910 | 0.022 | 0.199 |
| | | | | TOTAL ANNUAL RETURN | 3.51 |

*FIG. 9*

| CUSTOM BENCHMARK RETURNS | MV | BV | RATIO | CREDITING RATE (FOR NEXT MONTH) | CUSTOM BENCHMARK MONTHLY BV RETURNS (THESE WOULD BE INTERNAL CALCULATIONS FOR THE ANNUAL RETURN, NOT REPORTED. |
|---|---|---|---|---|---|
| 12/31/2009 | 1.000 | 1.000 | 1.000 | 0.040 | 0.327 |
| 1/29/2010 | 1.005 | 1.003 | 1.002 | 0.040 | 0.327 |
| 2/26/2010 | 1.010 | 1.007 | 1.003 | 0.041 | 0.327 |
| 3/31/2010 | 1.015 | 1.010 | 1.005 | 0.041 | 0.331 |
| 4/30/2010 | 1.020 | 1.013 | 1.007 | 0.042 | 0.336 |
| 5/31/2010 | 1.025 | 1.017 | 1.008 | 0.042 | 0.340 |
| 6/30/2010 | 1.030 | 1.020 | 1.010 | 0.042 | 0.344 |
| 7/30/2010 | 1.036 | 1.024 | 1.011 | 0.043 | 0.347 |
| 8/31/2010 | 1.041 | 1.027 | 1.013 | 0.043 | 0.351 |
| 9/30/2010 | 1.046 | 1.031 | 1.014 | 0.044 | 0.355 |
| 10/29/2010 | 1.051 | 1.035 | 1.016 | 0.044 | 0.358 |
| 11/30/2010 | 1.056 | 1.038 | 1.017 | 0.045 | 0.362 |
| 12/31/2010 | 1.062 | 1.042 | 1.019 | 0.045 | 0.365 |
| | | | | TOTAL ANNUAL RETURN | 4.22 |

FIG. 10

|  | MV | BV | RATIO | CREDITING RATE (FOR NEXT MONTH) | MONTHLY BV RETURNS: THESE WOULD BE THE SERIES OF REPORTED ONE MONTH CUSTOM BENCHMARK RETURNS |
|---|---|---|---|---|---|
| 12/31/2009 | 1.000 | 1.000 | 1.000 | 0.040 | 0.327 |
| 1/29/2010 | 1.005 | 1.003 | 0.991 | 0.040 | 0.327 |
| 2/26/2010 | 1.000 | 1.007 | 0.983 | 0.037 | 0.327 |
| 3/31/2010 | 0.995 | 1.010 | 0.974 | 0.035 | 0.307 |
| 4/30/2010 | 0.990 | 1.014 | 0.966 | 0.032 | 0.286 |
| 5/31/2010 | 0.985 | 1.017 | 0.959 | 0.030 | 0.266 |
| 6/30/2010 | 0.980 | 1.020 | 0.951 | 0.028 | 0.246 |
| 7/30/2010 | 0.975 | 1.023 | 0.944 | 0.025 | 0.226 |
| 8/31/2010 | 0.970 | 1.025 | 0.936 | 0.023 | 0.207 |
| 9/30/2010 | 0.965 | 1.028 | 0.929 | 0.021 | 0.189 |
| 10/29/2010 | 0.961 | 1.030 | 0.923 | 0.018 | 0.171 |
| 11/30/2010 | 0.956 | 1.032 | 0.916 | 0.016 | 0.153 |
| 12/31/2010 | 0.951 | 1.034 | 0.910 | 0.014 | 0.135 |
|  |  |  |  | TOTAL ANNUAL RETURN | 2.88 |

*FIG.11*

CUSTOMIZED PERFORMANCE BENCHMARKS FOR STABLE VALUE FUNDS

FIELD OF THE INVENTION

Embodiments of this invention relate to stable value funds. More specifically, embodiments of this invention relate to performance benchmarks for stable value funds.

BACKGROUND OF THE INVENTION

Plan sponsors, consultants, and investment managers have struggled to effectively benchmark the performance of stable value funds since the inception of synthetic GIC's ("wrap contracts") in the early 1990s. To measure the performance of stable value funds, the performance of stable value funds have typically been compared to the performance of standard indexes such as the Ryan GIC Indices, the MFR Money Market Index, a U.S. Treasury CMT Index, or a broad bond market index. However, none of these standard indexes used as benchmarks fairly measure the investible universe of asset strategies employed by stable value managers today. More importantly, none of these indexes as benchmarks provide a series of book value returns comparable to those generated by the crediting rate formulae associated with benefit responsive book value contracts like wrap and insurance separate account contracts of a stable value fund.

The crediting rate and its history encapsulate the performance of a stable value fund. Underlying this seemingly simple measure is a fairly complex calculation incorporating investments in book value contracts, as well as market value portfolios of fixed income securities. Furthermore, client-driven factors, such as the history of participant cash flows in and out of the subject fund, can meaningfully impact the performance of stable value funds. This makes the interpretation of a comparison between a traditional one-size-fits-all market value based index and the performance of a book value based stable value fund challenging.

Furthermore, individual stable value funds follow distinct strategies such that one benchmark may not be appropriate to measure the performance of all stable value funds.

Therefore, there is a longstanding frustrated need for performance benchmarks customized to measure the performance of the variety of distinct stable value funds.

DESCRIPTION OF THE FIGURES

The features and advantages of embodiments of the present invention can be understood by reference to the description herein taken with the following figures including embodiments of the invention. One embodiment of the invention is the Dwight Custom Stable Value Benchmark (the "Custom Benchmark").

FIG. 9 and FIG. 10 is an example which demonstrates the importance of calculating multi-period returns all at once, rather than linking multiple one-month returns to obtain a multi-period return.

FIG. 11 shows the results if the Custom Benchmark's market value and book value were reset to be equal to that of the stable value fund every month.

DESCRIPTION OF VARIOUS EMBODIMENTS

Figure 1:
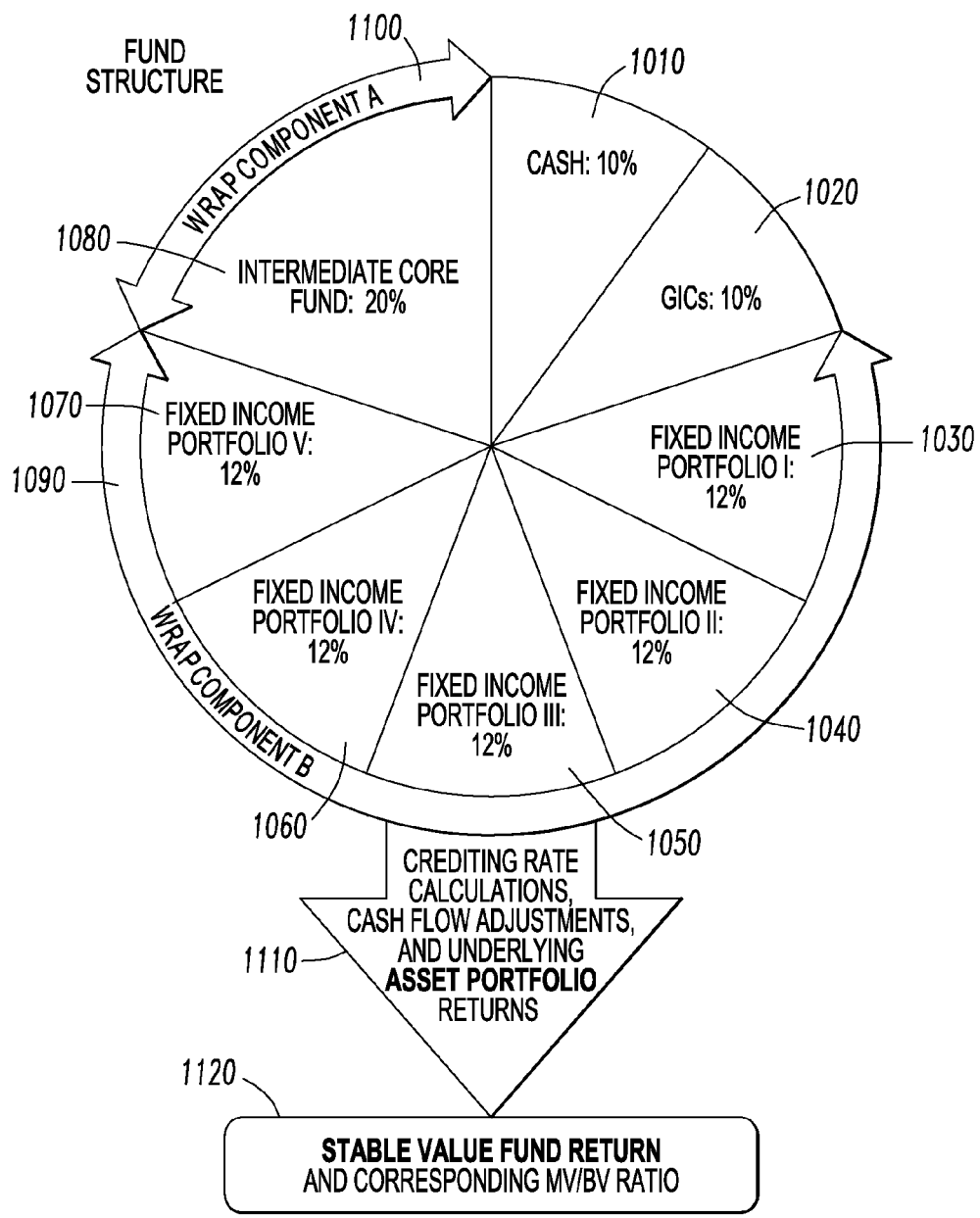
FIG. 1 shows an embodiment of an existing stable value fund structure for which a custom stable value benchmark would be developed by the present invention.

Embodiments of the present invention, for example, the Dwight Custom Stable Value Benchmark (the "Custom Benchmark"), calculate a customized performance benchmark for a stable value fund by incorporating client-specific factors and calculating an overall crediting rate, as if the assets underlying the wrap contracts and insurance separate account contracts were invested in the market indices to which the fund's portfolio strategies are benchmarked, rather than being invested in the actual underlying portfolios of the fund. The resulting Custom Benchmark translates market benchmark returns into book value returns and resulting market value to book value ratios, to compare to the actual stable value fund performance. The crediting rate process accounts for the yields, durations, and returns of the market value benchmarks in addition to client-specific cash flows and market value to book value ratios.

Embodiments of the present invention include a method using a computer for calculating a performance benchmark customized for a stable value fund, which fund is invested in a number of strategy portfolios, which portfolios are wrapped in a number of wrap contracts, the method comprising the steps of: (a) calculating using the computer the return performance of the stable value fund, and the corresponding market-value-book-value ratio; (b) selecting an appropriate benchmark index for each strategy portfolio; (c) calculating using the computer a benchmark crediting rate for the customized performance benchmark, as if the stable value fund had been invested in the appropriate benchmark indexes instead of the actual strategy portfolios; (d) applying using the computer the benchmark crediting rate and appropriate benchmark index returns to calculate a custom return performance benchmark and corresponding market-value-book-value ratio; and (e) comparing the actual performance of the stable value fund to the performance of the Custom Benchmark, and comparing the stable value fund market-value-book-value ratio to the Custom Benchmark market-value-book-value ratio.

To provide a better measure of stable value fund performance, Dwight Asset Management Company LLC ("Dwight") created the Custom Benchmark, which is an embodiment of the present invention. For the first time, the present invention calculates and applies crediting rates by substituting each underlying strategy's market value benchmarks for the actual underlying asset portfolios. The crediting rate process accounts for the yields, durations, and returns of the market value benchmarks in addition to client-specific cash flows and market value to book value ratios. The present invention translates market value benchmark returns into the familiar currency of book value returns, and corresponding market value to book value ratios. These measures finally provide plan sponsors, consultants, and investment managers a meaningful yardstick by which to measure manager performance on a book value basis.

Specifically, the present invention calculates customized performance benchmarks for stable value funds that measure the performance of the book value of an actual wrapped bond portfolio against the hypothetical book value of an appropriate bond index, as if that index's portfolio were wrapped in the same manner as the actual investments of the stable value fund. (This is distinct from the measure of the book value of a wrapped fund against the market value (NAV) of a hypothetical investment in a market value index.)

From a plan sponsor's perspective, the overall crediting rate and its history encapsulate the performance of a stable value portfolio. Underlying this seemingly simple measure lies a complex calculation incorporating book-value wrap and insurance separate account contracts, market-value portfolios of fixed income securities, traditional guaranteed investment contracts (GICs), cash instruments, and a detailed history of employee and employer driven contributions and withdrawals. Many client specific factors other than the market value returns of the underlying bond portfolios influence the performance of stable value funds. This makes the interpretation of a comparison between a traditional one-size-fits-all market value based index and the performance of a stable value portfolio challenging. The Custom Benchmark incorporates client-specific factors and calculates an overall crediting rate as if the underlying assets of the stable value fund had been invested in the market indices to which the fund's strategies are benchmarked, rather than the actual fund portfolios themselves. This measure provides the plan sponsor with a meaningful metric to measure fund performance by translating market benchmark returns into stable value fund crediting rates and resulting market value to book value ratios.

Dwight constructs the Custom Benchmark by applying the same calculations which determine a stable value fund's crediting rate. If a fund encompasses more than one wrap contract, or additional book value investments, such as traditional GICs or cash instruments, then its Custom Benchmark contains separate components corresponding to each of the fund's constituent parts. Like an actual stable value portfolio, the crediting rates and book values of each component are calculated separately and then combined to determine the overall crediting rate and book value of the Custom Benchmark. For each component, the crediting rate depends on the its book value, the market value of its underlying bond portfolio, and the yield and duration of the market indices to which the underlying bond portfolios are benchmarked. The crediting rate formula stipulated by each wrap contract is applied to its corresponding benchmark component. Consistent with the standard stable value industry convention, a one month lag is applied to the calculation of the crediting rate. This means that the book values, market values, durations, and yields as of the end of January are used to calculate the crediting rate for March. This crediting rate is applied to the book value as of the end of February to determine the book value at the end of March. The end-of-month market value of each component is determined by increasing the beginning-of-month market value of each bond portfolio by the actual return realized by the market Index to which it is benchmarked. For GICs and cash instruments, market values and book values are in general equal under normal conditions. Components associated with cash instruments accrue at a money index rate such as the MFR Money Market Index rate, while GIC components earn a return equal to that of a GIC index such as the Ryan 5-year or 3-year GIC Index, dependent on whether the duration of the GIC in question is greater than or less than 2 years.

The Custom Benchmark construction process accounts for client-driven cash-flows on a monthly basis, making the simplifying assumption that all flows occur halfway through the month. The difficulty and challenge of gathering accurate intra-month data from external managers precludes a more detailed daily treatment. Half of a given month's crediting rate is applied to a contribution or withdrawal before adding or deducting this amount to the month-end book value of the wrap. The monthly return of the underlying bond portfolio return is assumed to accrue linearly over the course of the month, and the same rule described above for book values also applies to market values; i.e., half the realized monthly return of the market index is applied to contributions and withdrawals before they are added or subtracted from the month-end market value. As with the crediting rate calculation, this process treats each benchmark component separately, applying the actual cash-flows which impacted each of the associated wraps, GICs, or cash instruments.

The present invention uses the same logic used to determine the blended crediting rate and overall market-to-book value ratio of a stable value fund for the calculation of these values for the Custom Benchmark from its constituent components. The market values of all underlying bond portfolios, GICs, and cash instruments add up to the overall market value of the Custom Benchmark. Similarly, the book values of each component are simply aggregated to reach the total book value of the Custom Benchmark. The overall crediting rate is calculated by taking a book-value-weighted average of the rates of each component.

Figure 7:
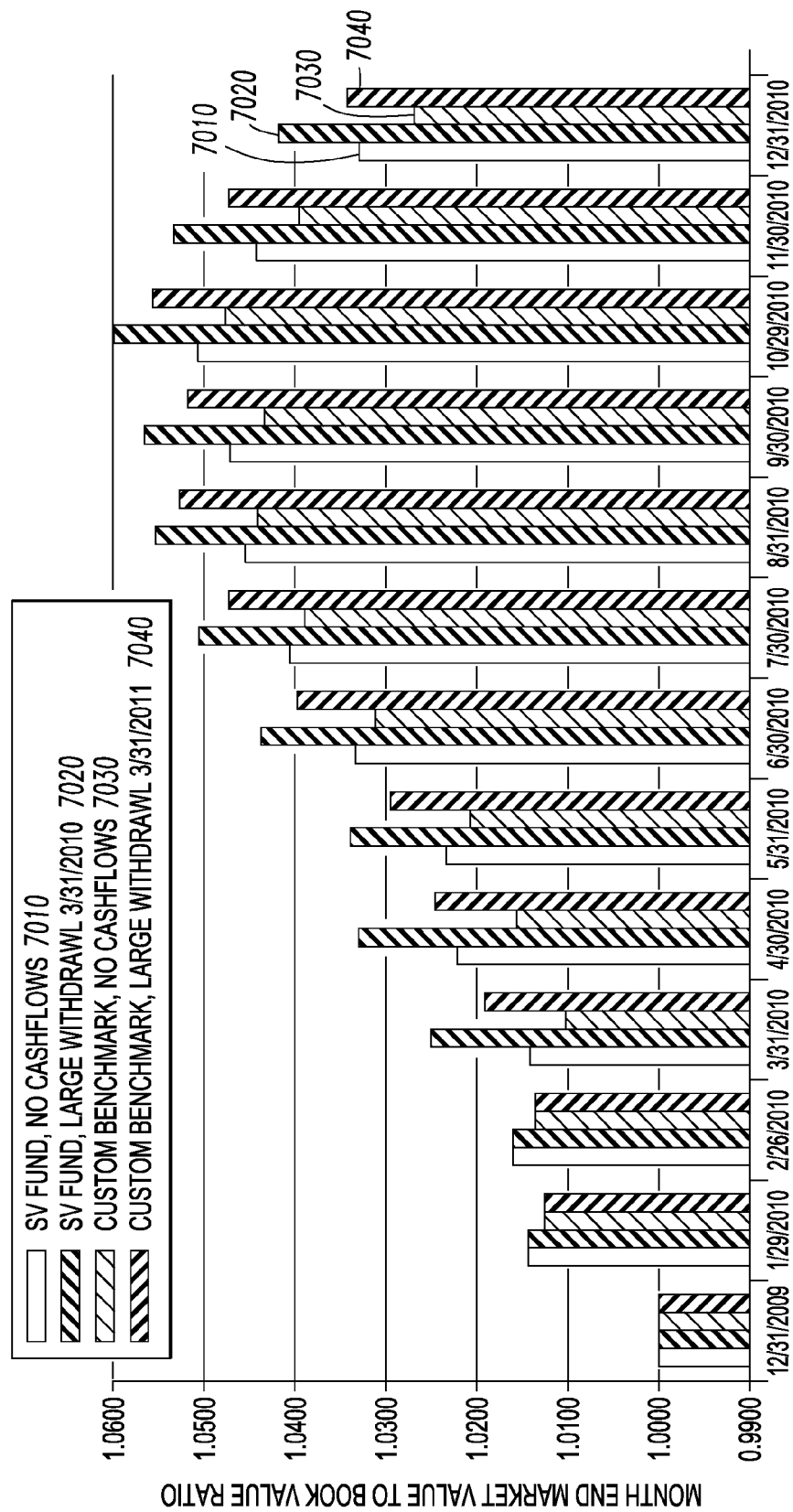
FIG. 7 shows the monthly market-to-book value ratio of the stable value fund and its Custom Benchmark from FIG. 4 for a 12 month period.

The ability to properly capture multi-period performance reveals the full power of the Custom Benchmark methodology. The current crediting rate of a stable value fund depends of the market to book value ratio from the prior period, which in turn depends on the crediting rate, client driven cash-flow history, and market to book value ratio from the period before that. Iterating this logic, one can see that the entire history of the stable value fund influences its current performance. Multi-month Custom Benchmark performance calculations mirror those performed on actual stable value funds, reproducing this memory effect. (See FIG. 7, showing how the Custom Benchmark mimics the stable value fund "memory" of past performance and captures the impact of client cash flows.) When linking together consecutive months, the crediting rate of each component of a Custom Benchmark in one month determine its starting book value in the next month. Similarly, the realized returns of the underlying portfolios' market benchmark indices determine each components starting market value in the next month. After the first month of a multi-month calculation, the market to book value ratio of the Custom Benchmark will begin to diverge from that of the stable value fund whose performance it benchmarks and measures. This behavior captures the compounding effect of strong or weak performance and the persistence of the impact of the timing and amount of client cash-flows. It is important to note that simply compounding multiple one month Custom Benchmark crediting rates will not reproduce this same effect. Multi-month periods must be calculated all-at-once, and a quarterly return will in general not be equal to the compounding of the returns of its three constituent months.

Existing Stable Value Fund Structure

FIG. 1 shows an embodiment of the fund structure for a prior art stable value fund. In this embodiment cash 1010 is ten percent of the fund. GICs (Guaranteed Investment Contracts) 1020 is ten percent of the fund. A fixed income portfolio (I) 1030 is twelve percent of the structure. A fixed income portfolio (II) 1040 is twelve percent of the structure. A fixed income portfolio (III) 1050 is twelve percent of the structure. A fixed income portfolio (IV) 1060 is twelve percent of the structure. A fixed income portfolio (V) 1070 is twelve percent of the structure. An Intermediate Core Bond Fund 1080 is twenty percent of the fund.

The cash 1010 and the GICs 1020 are not wrapped. The bond funds I-V 1030, 1040, 1050, 1060, and 1070 are wrapped by one wrap contract (B) 1090. The Intermediate Core Fund 1080 is wrapped by another wrap contract (A) 1100. Crediting rate calculations and underlying asset portfolio returns 1110 are then used for this fund structure. This calculates the stable value fund performance and corresponding market value to book value ratios 1120.

Customized Benchmark Structure

Figure 2:
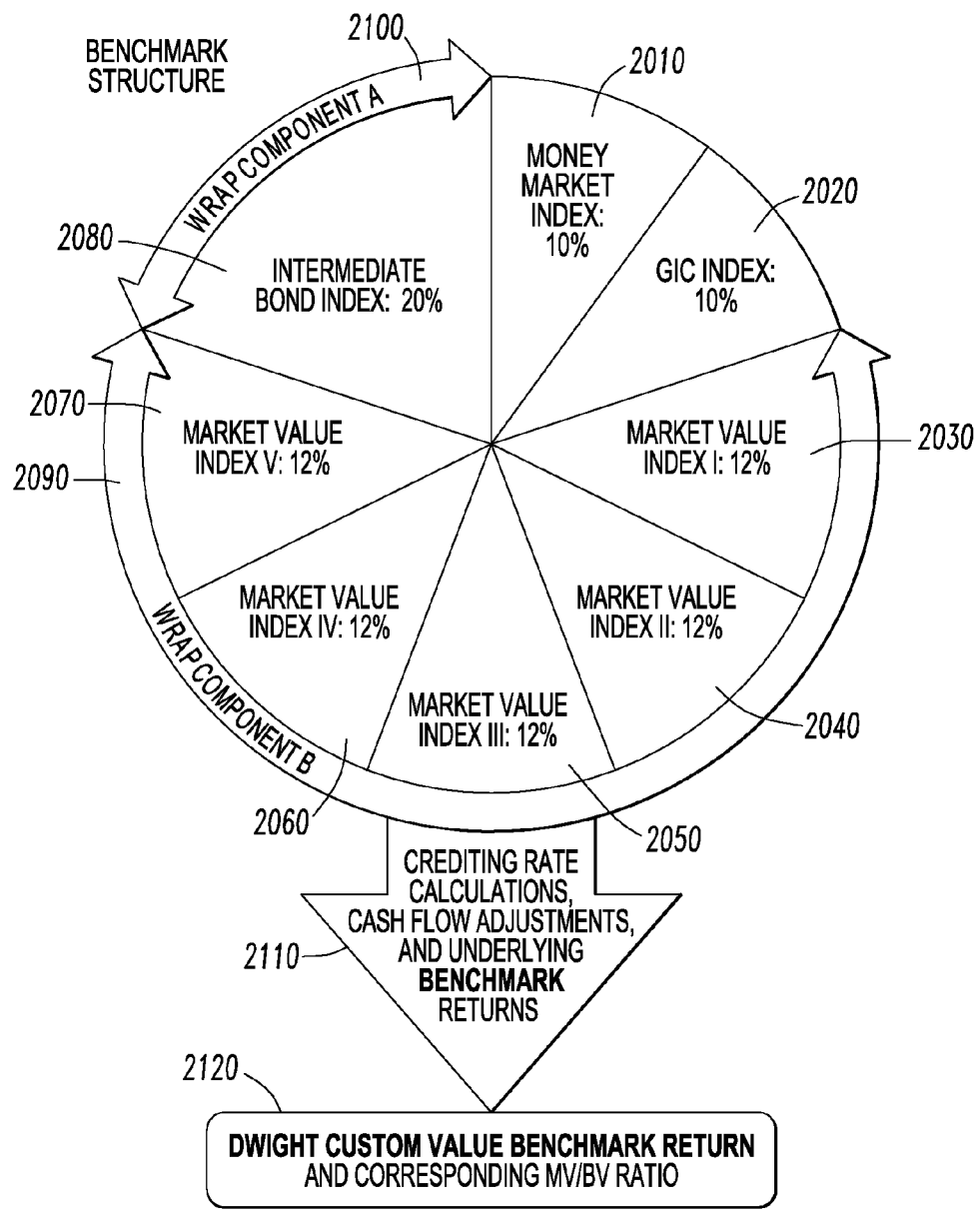
FIG. 2 shows an embodiment of the claimed invention providing a Custom Benchmark structure by which to determine the performance of the stable value fund shown in FIG. 1.

FIG. 2 shows an embodiment of the claimed invention providing a Custom Benchmark structure used to determine the performance of the stable value fund shown in FIG. 1. In this embodiment, a Money Market Index 2010 is ten percent of the portfolio structure. A GIC Index 2020 is ten percent of the benchmark portfolio structure. A market value index (I) 2030 is twelve percent of the structure. A market value index (II) 2040 is twelve percent of the structure. A market value index (III) 2050 is twelve percent of the structure. A market value index (IV) 2060 is twelve percent of the structure. A market value index (V) 2070 is twelve percent of the structure. An intermediate bond index 2080 is twenty percent of the structure. In this embodiment, a money market index 2010 and a GIC Index 2020 are not wrapped. The benchmarks 2030, 2040, 2050, 2060, and 2070, are wrapped by one wrap contract (B) 2090. The intermediate bond index 2080 is wrapped by another wrap contract (A) 2100. Crediting rate calculations and underlying benchmark returns 2110 are then applied as applicable to this structure to calculate an embodiment of the present invention, the Custom Benchmark Performance 2120 and corresponding market value and book value ratio.

The Crediting Rate

It is difficult to evaluate a stable value fund's performance. From a stable value plan sponsor's perspective, the overall crediting rate and its history encapsulate the performance of a stable value portfolio. Underlying this seemingly simple measure lies a complex calculation incorporating investments in book-value wrap and insurance separate account contracts, market-value portfolios of fixed income securities, traditional guaranteed investment contracts ("GICs"), and cash instruments. In addition, client driven factors such as the history of employee and employer contributions and withdrawals impact the performance of stable value funds. This makes the interpretation of a comparison between a traditional one-size-fits-all market value based index and the performance of a stable value portfolio challenging.

To provide a better measure of stable value fund performance, Dwight created the Custom Benchmark which is an embodiment of the present invention. The Custom Benchmark incorporates client-specific factors and calculates an overall crediting rate, as if the assets underlying the wrap contracts and insurance separate account contracts had been invested in the market indices to which the strategies are benchmarked, rather than being invested in the actual underlying portfolios of the fund (see FIGS. 1, 2, 3A and 3B). The Custom Benchmark translates market benchmark returns into book value returns and resulting market value to book value ratios (see FIG. 4). This measure provides plan sponsors a meaningful way to measure a stable value fund investment manager's performance.

Figure 3A:
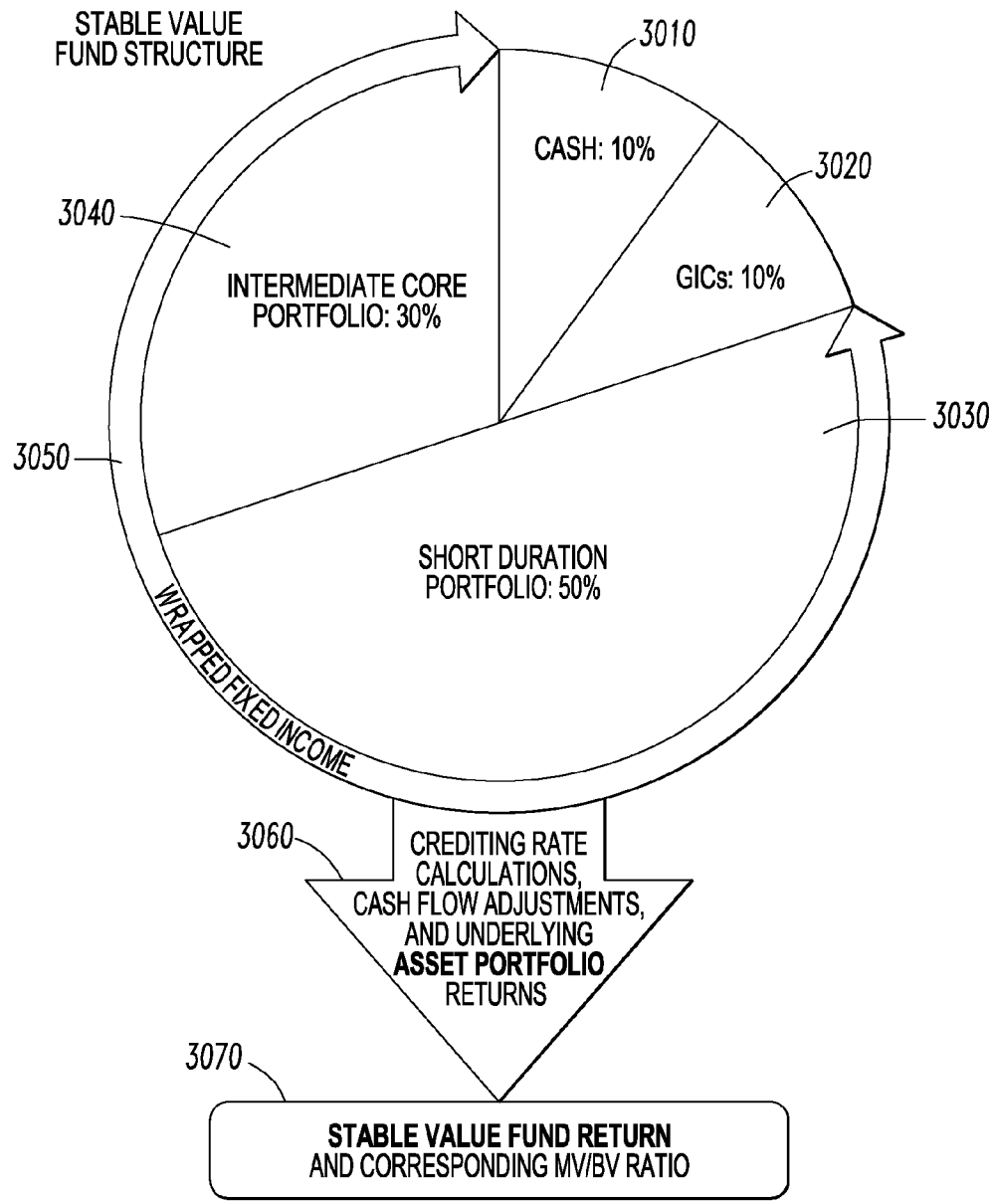
FIG. 3A shows an embodiment of a stable value fund structure.
Figure 3B:
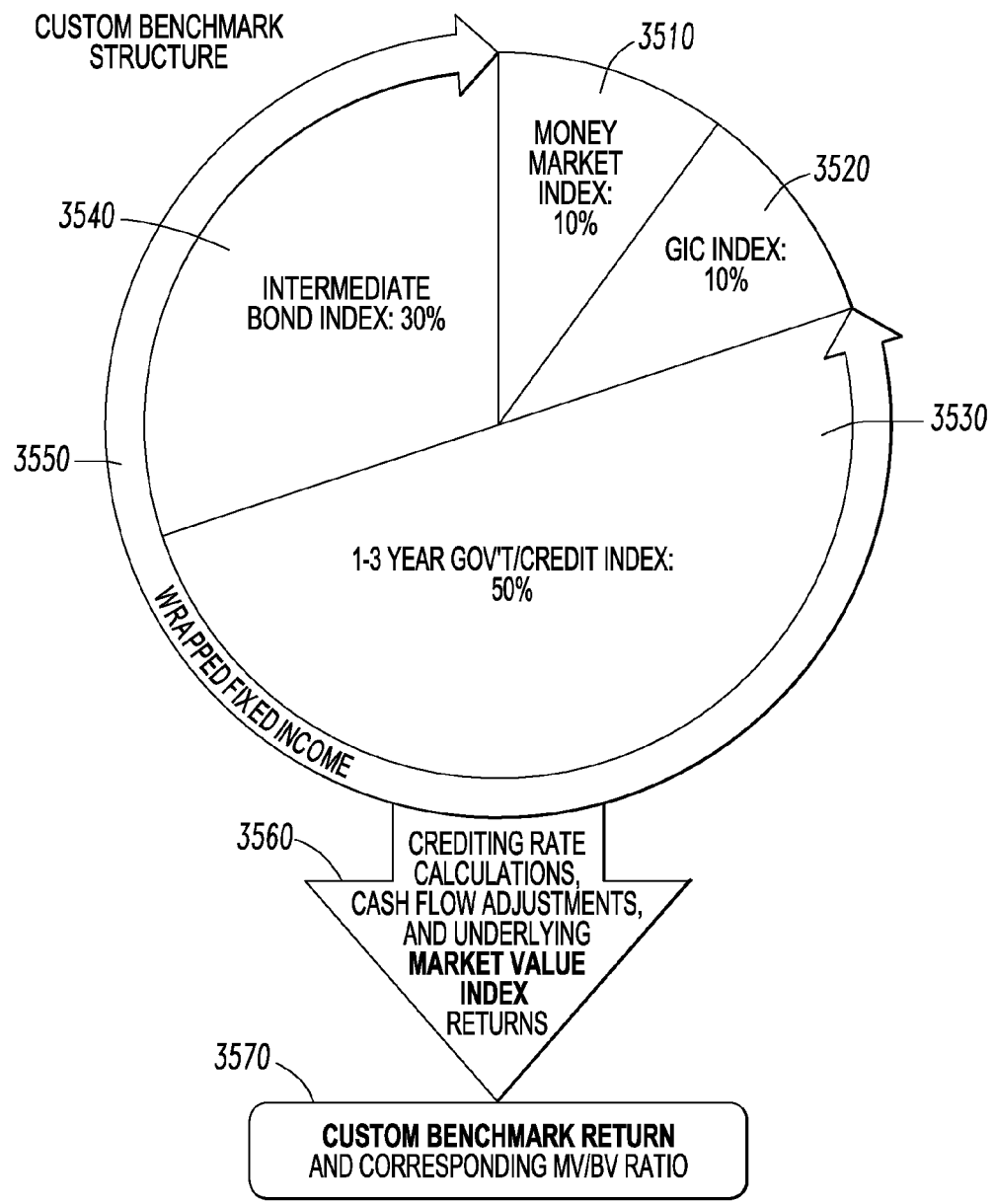
FIG. 3B shows a Custom Benchmark structure for the fund in FIG. 3A.

FIG. 3A shows an embodiment of a stable value fund structure and FIG. 3B shows an embodiment of a Custom Benchmark structure for the fund. In FIG. 3A, cash 3010 is 10 percent of the fund. GICs (guaranteed investment contracts) 3020 are 10 percent of the fund. The short duration portfolio 3030 is 50 percent of the fund. The intermediate core portfolio 3040 is 30 percent of the fund. The cash 3010 and GICs 3020 are not wrapped. The portfolios 3030 and 3040 are wrapped using a wrap contract 3050. Crediting rate calculations, cash flow adjustments, and underlying asset portfolio returns 3060 are then used for this fund's structure. This calculates 3070 as stable value fund return and market value-to-book value ratios 3070.

FIG. 3B shows an embodiment of the claimed invention providing a Custom Benchmark structure used to determine the performance of this stable value fund shown in FIG. 3A. In this embodiment, the Money Market Index 3510 is 10 percent of the portfolio's structure. The GIC Index 3520 is 10 percent of the benchmark portfolio structure. The One-Three Year Government/Credit Index 3530 is 50 percent of the structure. And the Intermediate Bond Index 3540 is 30 percent of the structure. In this embodiment the Money Market Index 3510 and the GIC Index 3520 are not wrapped. The One-Three Year Government/Credit Index 3530 and the Intermediate Bond Index 3540 are wrapped using a wrap contract 3550. The crediting rate calculations, cash flow adjustments, and underlying market value index returns 3560 are then applied as applicable to this structure to calculate the Custom Benchmark return and corresponding market value-to-book value ratio 3570.

Figure 4:
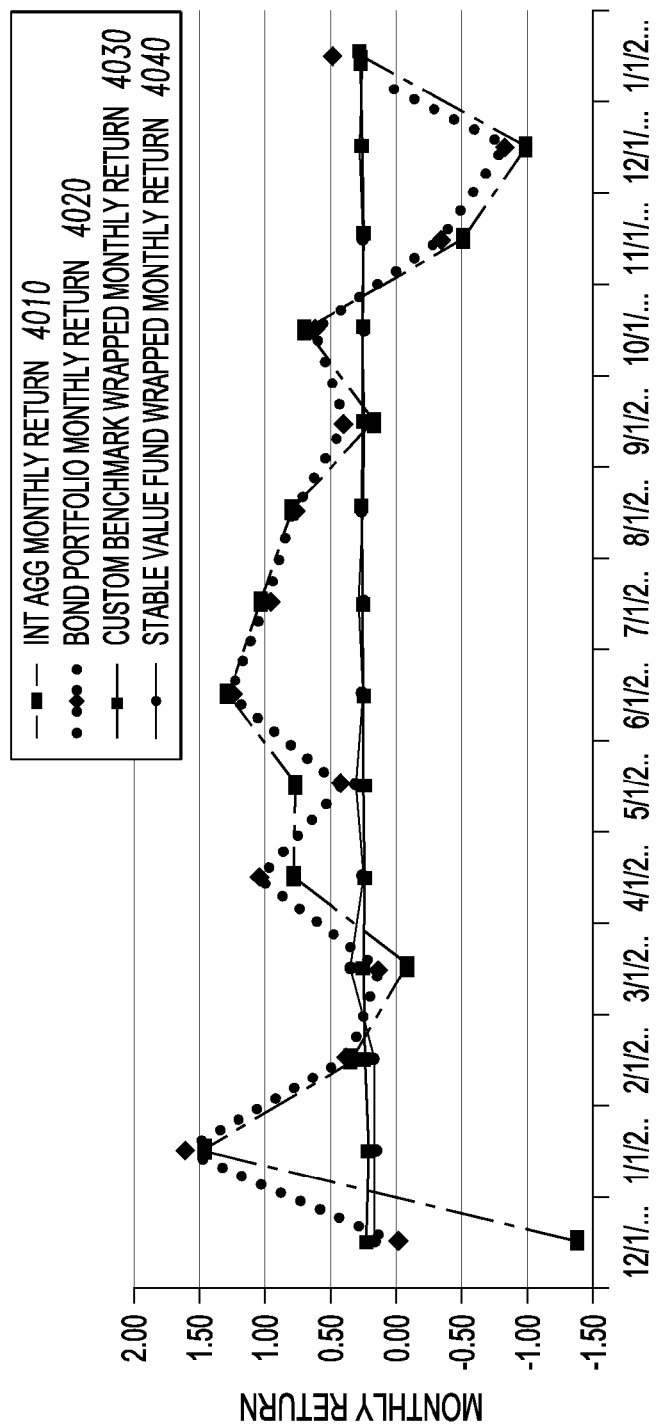
FIG. 4 shows monthly returns of a market value index, a bond portfolio, a Custom Benchmark, and a stable value fund.

FIG. 4 shows the monthly market returns of a bond portfolio 4020 and the Intermediate Aggregate Index 4010 for 2010. Superimposed on these market returns are the wrapped returns of a hypothetical stable value fund 4040 invested entirely in the bond fund and that of its Custom Benchmark 4030. The Custom Benchmark 4030 provides a meaningful yardstick by which to measure the performance of the stable value fund 4040. The monthly return is shown on the vertical axis. The months are shown on the horizontal axis. Note that both the stable value fund and its Custom Benchmark exhibit the volatility smoothing which is the hallmark of stable value funds and the characteristic lag between wrapped returns and underlying market performance.

The Crediting Rate Calculation

Figure 5:
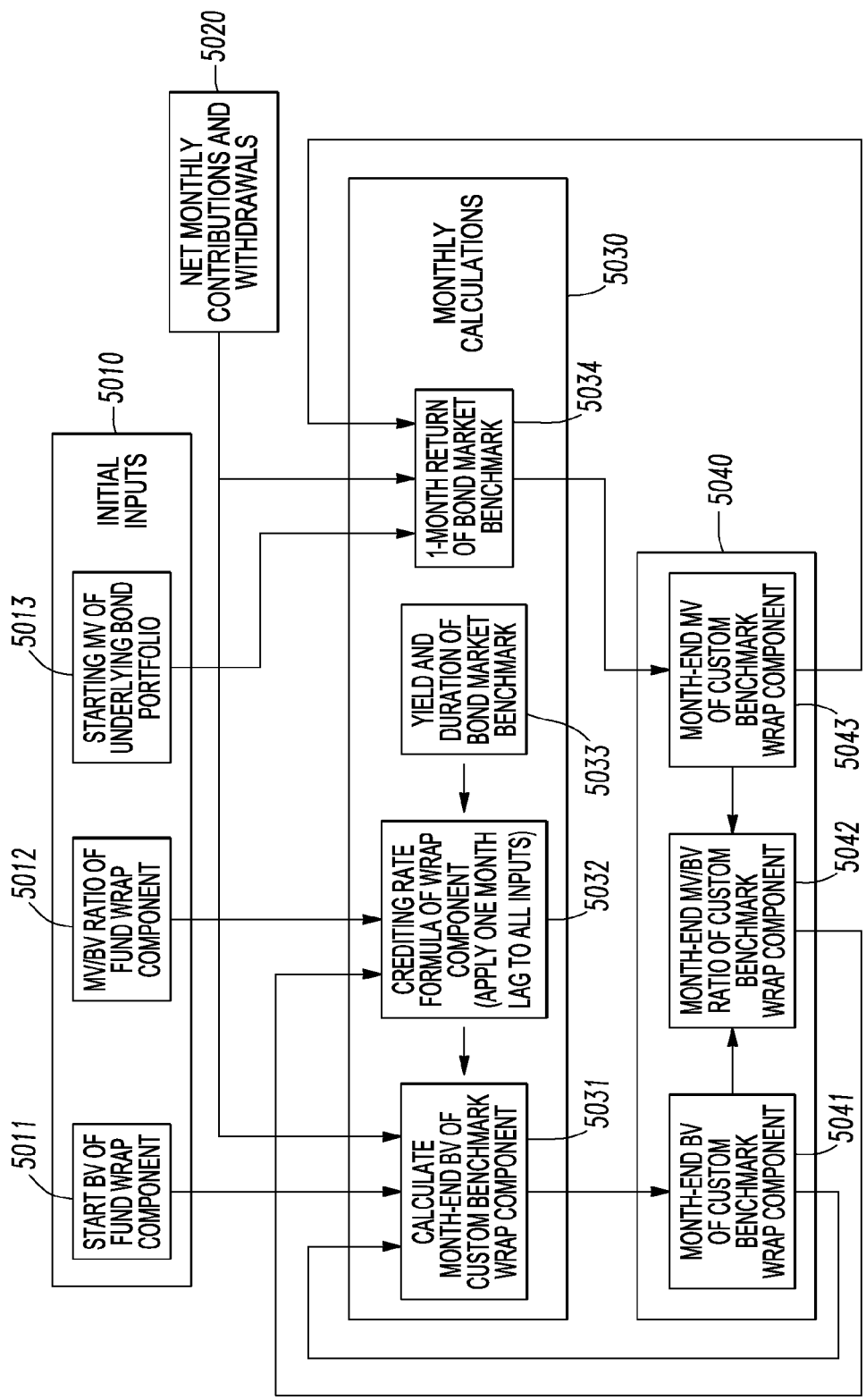
FIG. 5 shows an example of a single Custom Benchmark wrap component with a single underlying bond portfolio.
Figure 6:
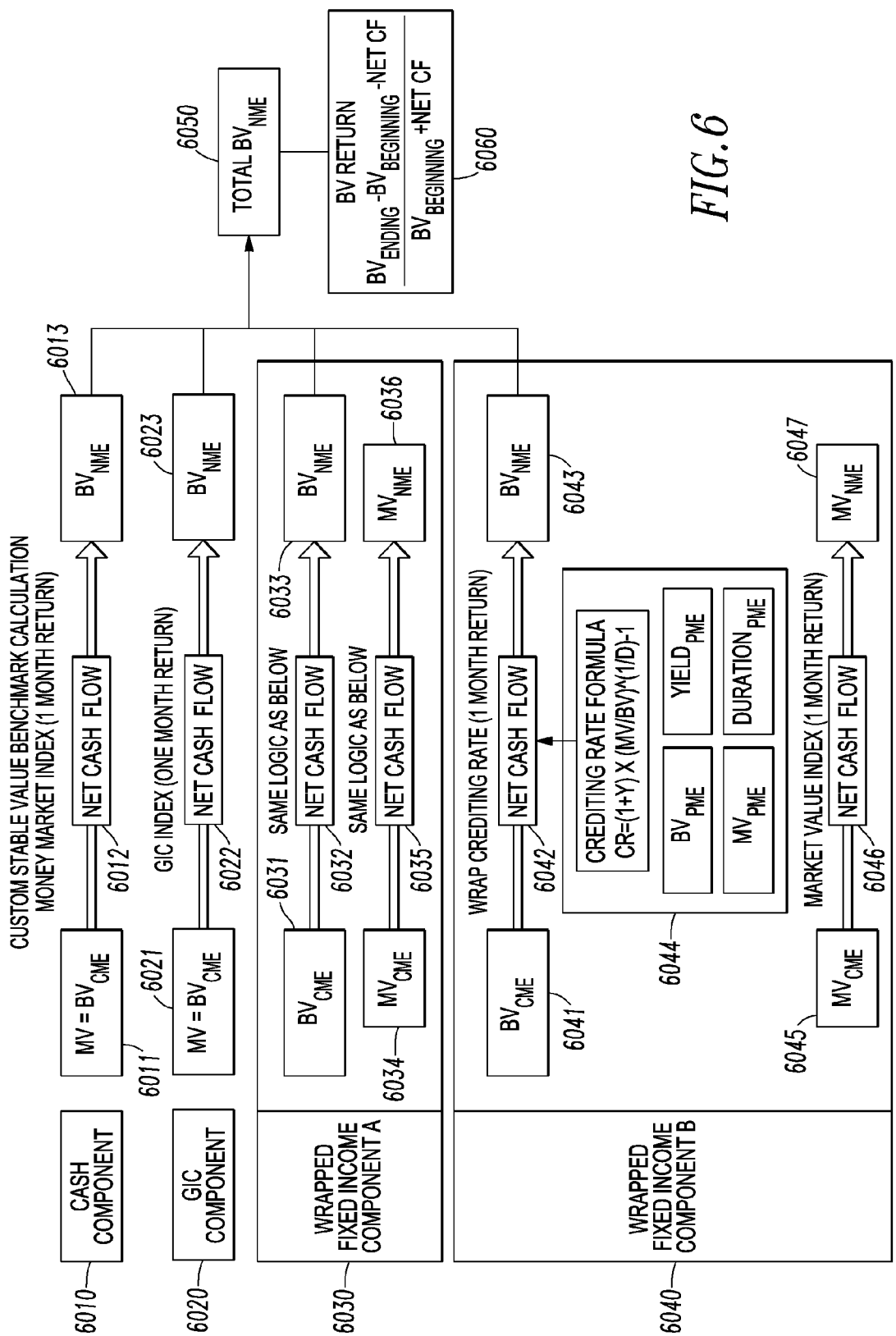
FIG. 6 shows a Custom Benchmark calculation process.

The Custom Benchmark is constructed by applying the same calculations which determine a stable value fund's crediting rate (see FIG. 5). (FIG. 5 shows an example of a Custom Benchmark's single wrap component with a single underlying bond portfolio.) If a fund holds more than one wrap contract, or additional book value investments such as GICs or cash instruments, then its Custom Benchmark will contain multiple components corresponding to each of the stable value fund's constituent parts (see FIG. 6). (FIG. 6 shows a Custom Benchmark calculation process.) As with an actual stable value fund, the crediting rates and book values of each benchmark component are calculated separately and then combined to determine the overall crediting rate and book value of the Custom Benchmark.

FIG. 5 shows an example of a single wrapped component with a single portfolio. FIG. 6 shows a Custom Benchmark calculation process.

In FIG. 5 the Custom Benchmark is constructed by applying the same calculations which determine a stable value fund's crediting rate. The initial inputs 5010 are a starting book value of the fund wrap component 5011, the market value-to-book value ratio of the fund wrap component 5012 and the starting market value of the underlying bond portfolio

5013. These initial inputs 5010 are used in the monthly calculations 5030 in the steps indicated in FIG. 5.

The monthly calculations 5030 calculate the one-month return of the bond market benchmark 5034. Also, the yield and duration of the bond market benchmark 5033 is calculated. The crediting rate formula of the wrap component (one-month lag is applied to all inputs) is calculated 5032. Furthermore the process calculates a month-end book value of the Custom Benchmark wrap component 5031. In the next phase of calculation 5040 the month-end market value of the Custom Benchmark wrap component 5043 is calculated. The month-end market value-to-book value ratio of the Custom Benchmark wrapped component 5042 is calculated. And the month-end book value of the Custom Benchmark wrap component 5041 is calculated. The net monthly contributions and withdrawals 5020 are also used in the appropriate monthly calculations.

Element 5034 receives appropriate data inputs from elements 5013, 5020 and 5043. Element 5032 receives data inputs from elements 5033, 5012, and 5042. Element 5031 receives appropriate data inputs from elements 5011, 5020 and 5041. Element 5043 receives appropriate data inputs from element 5034. Element 5042 receives data inputs from 5043 and 5041. And element 5041 receives data input from 5031.

FIG. 6 shows a Custom Benchmark calculation process from another prospective. For the cash component 6010 the market value equals the book value$_{CME}$ (CME=current month end) 6011. A money market index 1 month return, such as the MFR Money Market Index is utilized to yield a book-value$_{NME}$ (NME=next month end) 6013 and is adjusted to reflect any net cashflow 6012.

The GIC component 6020 starts with the market value equaling the book value$_{CME}$ 6021. A GIC index 1 month return, such as the Ryan Three- or Five-Year GIC Index is utilized to yield a book value$_{NME}$ 6023 and is adjusted to reflect any net cashflow 6022.

The wrapped fixed income component A 6030 starts with the book value$_{CME}$ 6031, and using the same logic on crediting rate and net cash flow 6032 as discussed in element 6040 below to yield the book value$_{NME}$ 6033. Also in element 6030 the market value$_{CME}$ 6034 uses the same logic for the market value return and the cash flow 6035 as discussed in element 6040 below to yield market value$_{NME}$ 6036.

Wrapped fixed income component B 6040 starts with the book value$_{CME}$ 6041 and applies the wrap crediting rate (1 month return) as calculated by the crediting rate formula 6044 and is adjusted to reflect net cashflow 6042 to yield the book value$_{NME}$ 6043 of wrapped fixed income component B.

In element 6044 the crediting rate formula as indicated in FIG. 6 (and described elsewhere herein) is applied to the BV$_{CME}$ 6041 and the net cash flow 6042, the yield$_{PME}$, the market value$_{PME}$, and the duration$_{PME}$, to arrive at BV$_{NME}$ 6043. The market value index (1 month return) is applied to the MV$_{CME}$ 6045 and adjusted to reflect net cash flow 6046 to arrive at MV$_{CME}$.

Elements 6013, 6023, 6033, 6036 and 6043, are applied to develop the total book value$_{NME}$ 6050 and the book value return 6060 according to the formula indicated in element 6060, that is, (BV ending minus BV beginning minus net CF) divided by (BV beginning plus net CF).

For each wrapped component, the crediting rate depends on the its book value, the market value of its underlying bond portfolio, and the yield and duration of the market indices to which the underlying bond portfolios are benchmarked. The exact crediting rate formula stipulated by each wrap contract is applied to its corresponding benchmark component, as there are subtle differences in contract formulas. Consistent with the standard stable value industry convention, the inputs to the crediting rate formula are as of the last business day before the calendar month immediately preceding a rate reset, i.e., a one month lag is applied to the calculation of the crediting rate. This means that the book values, market values, durations, and yields as of the end of January are used to calculate the crediting rate for the month beginning March 1.

Book Value

In the absence of external cash-flows (e.g. contributions, withdrawals, transfers between components), this crediting rate is accrued daily to the book value as of February 28 to determine the book value for March 31. This month end book value is then adjusted to account for external positive or negative cash-flows occurring during the month of March by applying the crediting rate to the net cash-flows as if they had all occurred in the middle of the month (March 15). Mathematically, this is equivalent to applying half of the crediting rate for an entire month to the net cash-flows to increase or decrease the month end book value.

Market Value

In the absence of external cashflows, the month end calculated benchmark market value of each component is similarly determined by increasing the beginning-of-month corresponding benchmark market value by the actual return realized by the market index to which that component is benchmarked. Cash-flows are accounted for in the same manner as for the book value calculation by adjusting the end-of-month market value by applying each market indices actual return to the net cash-flows as if they had all occurred at the middle of the month.

GICs and Cash

For GICs and cash instruments, market values and book values are in general equal under normal conditions. The Cash component of the Custom Benchmark simply accrues at a money market index rate, such as the MFR Money Market Index rate, while GIC components credit a return equal to that of a GIC index, such as the Ryan 5-year or 3-year GIC Index as determined by the duration of each GIC.

In FIG. 6 the subscript "PME" stands for "Prior Month End", "CME" stands for "Current Month End" and "NME" stands for "Next Month End". In the example discussed above, PME is the end of January, CME is the end of February, and NME is the end of March.

Monthly and Daily Treatment

The Custom Benchmark construction process described above accounts for client-driven cash-flows on a monthly basis by making the simplifying assumption that all flows occur halfway through the month. The difficulty and challenge of gathering daily intra-month cash flow data make a more detailed daily calculation methodology impractical within the context of the current implementations. The scope of this invention, however, includes such a daily treatment. A daily treatment would be preferable, if all of the necessary transaction and return data were easily accessible. All processes described within this disclosure apply to a daily treatment with the exception of the mid-month approximation described above for the application of transactions. For a daily treatment, all cash-flows would be applied on the date they actually occur. The crediting rate would be applied to the actual number of days that the investments were in the portfolio to calculate the month-end book value. Daily market returns of the underlying market indices would be compounded and applied to investments for the time period over which the investments were in the portfolios.

Embodiments of the present invention use the same logic used to determine the blended crediting rate and overall market-to-book value ratio of a stable value fund to the calculation of these values for the Custom Benchmark from its constituent components. The calculated benchmark market values for each of the underlying bond portfolios, GICs, and cash instruments combine to add up to the overall market value of the Custom Benchmark. Similarly, the corresponding book values of each benchmark component are simply aggregated to reach the total book value of the Custom Benchmark. It is important to note that for GICs and cash instruments, market and book values are in general equal under normal conditions. The overall crediting rate is, calculated by taking a book-value-weighted average of the rates of each constituent benchmark book value component.

The ability to capture multi-period performance reveals the full scope of the Custom Benchmark methodology. For market-valued investments, benchmark returns from monthly and quarterly periods may be linked together to calculate the overall benchmark return for annual and multi-year periods. This is possible because performance from prior periods does not directly influence the performance of subsequent periods. Unfortunately, this is not possible within the context of a stable value investment, because of the manner in which past performance directly influences future performance. The amortization mechanism by which a stable value fund smoothes out market volatility involves "remembering" past performance via the market value-to-book-value ratio (sometimes referred to herein as the "MB ratio" or the "MV/BV Ratio"). The current MB ratio, which is determined by the history of past performance and client-driven cash-flow activity, directly governs the future monthly crediting rate, as indicated in the following formula:

$$CR=(1+\text{Yield})\times(MV/BV)^{(1/\text{Duration})}-1$$

where CR is the crediting rate, Yield is the annualized yield of the underlying market-value investments, MV is the market value of the underlying investments, BV is the book value of the wrap, and, Duration is the duration of the underlying market-value investments.

Thus, the starting M/B ratio for a given month is a dominant determinant of the return for the following period, regardless of the underlying market investment. For multi-month Custom Benchmark calculations, it is important to carry forward the M/B ratio generated by the Custom Benchmark's performance rather than reset this ratio to be equal to that of the stable value fund each month. If one were to do the latter, then the stable value fund's performance would be a determining factor in the Custom Benchmark's performance, due to the strong role the M/B ratio plays in the monthly crediting rate calculation.

Thus, the current crediting rate of a stable value fund depends on the market value to book value ratio from prior periods, which in turn depends on the crediting rate, client driven cash-flow history, and market value to book value ratio from the period before that. Iterating this logic, one can see that the entire history of a stable value fund influences its current performance. Multi-month Custom Benchmark performance calculations mirror those performed on actual stable value funds. When linking together consecutive months, the crediting rate of each component of a Custom Benchmark in one month and the net cash flows determine the starting book value of each component of the Custom Benchmark in the next month. Similarly, the realized returns of the underlying portfolios' market benchmark indices and net cash-flows to the portfolio determine each component's starting market value in the next month.

After the first month of a multi-month calculation, different monthly market value returns and different crediting rates will cause the market value to book value ratio of the Custom Benchmark to diverge from that of the actual stable value fund which is evaluated against the Custom Benchmark. This reflects the fact that a wrapped stable value structure "remembers" past performance for an extended period of time.

Client-driven withdrawals occurring when the market-to-book value ratios of a stable value fund and its Custom Benchmark are unequal will tend to amplify this difference, while contributions will serve to diminish it (see FIG. 7). These phenomena capture the persistent impact of the timing and amount of client cash-flows. It is important to note that simply compounding multiple one month Custom Benchmark crediting rates will not reproduce this same effect. Multi-month periods must be calculated all-at-once, and a quarterly return will in general not be equal to the compounding of the returns of its three constituent months.

FIG. 9 and FIG. 10 is an example which demonstrates the importance of calculating multi-period returns all at once, rather than linking multiple one-month returns to obtain a multi-period return. Consider a hypothetical stable value fund and its Custom Benchmark over the course of 2010. Assume that the underlying market portfolio has a constant duration of 4 years, a yield of 4.5%, and posts −50 bps of market value returns per month for the entire year. The more conservative market benchmark has a duration of 3.5 years, a yield of 4%, and delivers +50 bps of market value return per month for the entire year. Given the crediting rate formula above, at the end of the year the stable value fund will have a MV/BV ratio of 0.91 and will have earned a cumulative book value return of 3.5%. Using our current methodology, the Custom Benchmark's final MV/BV ratio will be 1.02 and its cumulative book value return will be 4.2%. FIG. 9 and FIG. 10 show how this evolution occurs.

Note that in this example, the Market Value and Book Value of the Custom Benchmark are independent from those of the stable value fund, and are determined based upon the market returns, yield, and duration of the underlying market index.

Finally, the series in FIG. 11 shows the results if the Custom Benchmark's market value and book value were reset to be equal to that of the stable value fund every month. This example corresponds to what would happen if you simply linked all of the one-month Custom Benchmark returns reported over the course of the year to determine the Custom Benchmark annual return. In this case, the final market to book ratio of the Custom Benchmark equals that of the stable value fund (0.91), and the total book return of the Custom Benchmark is only 2.88%. In this example, the Custom Benchmark's performance is not only being reduced by having a lower yielding underlying market index than the stable value fund, but it is also suffering from the poor market performance of the stable value fund itself.

In this example, in FIG. 11, the difference in market returns between the stable value fund and its Custom Benchmark are rather extreme. Smaller differences in returns produce smaller book value return deviations, but the principle still applies. Furthermore, client cash-flows which may accentuate deviations of the MV/BV ratio from 1 will serve to further distort the result one would obtain by linking 1-month returns. The spreadsheet containing all of the calculations shown in this example is attached: "CustomBenchmarkLinkingExample.xls".

In FIG. 7 is shown the monthly market-to-book value ratio of the stable value fund and its Custom Benchmark from FIG. 4 for a 12 month period. In this example, on March 31, a large client-driven withdrawal is made, accentuating the gain position of both the stable value fund and the Custom Benchmark.

The effect of the early performance advantage of the fund persists for the entire period and is amplified by the March withdrawal.

In addition to capturing the effect of client driven cash flows on book value returns, the Custom Benchmark also enables the Custom Benchmark's book value performance to be attributed to different sources. This "Book Value Performance Attribution" separates and attributes the contributions to overall Custom Benchmark performance between those derived from the market performance of the underlying investments and the impact of client-driven cashflows. Mathematically, this is expressed as follows:

Let $F_{ret}$ be the total return of the stable value fund over a given period, and let $B_{ret}$ be the total return of the Custom Benchmark over the same period. All of the calculations used to determine these two returns may be repeated, omitting the influence of any cashflows, to calculate the modified returns $\tilde{F}_{ret}$ and $\tilde{B}_{ret}$. $\tilde{F}_{ret}$ and $\tilde{B}_{ret}$ which are what the returns of the Custom Benchmark and the stable value fund would have been if there had not been any contributions or withdrawals from the stable value fund over the calculation period. These two measures represent the contribution to performance from the underlying market valued investments to the returns of the stable value fund and the Custom Benchmark, respectively.

The contribution to stable value fund returns from client cashflows is $F_{CF}=F_{ret}-\tilde{F}_{ret}$.

The contribution to Custom Benchmark returns from client cashflows is $B_{CF}=B_{ret}-\tilde{B}_{ret}$.

The Custom Benchmark relative performance of a stable value fund is: $P_{Total}=F_{ret}-B_{ret}$.

This performance may then be attributed to an underlying market component $P_{Market}=\tilde{F}_{ret}-\tilde{B}_{ret}$ and a cashflow component $P_{CF}=P_{Total}-P_{Market}=F_{ret}-B_{ret}-\tilde{F}_{ret}+\tilde{B}_{ret}$.

In addition to these total historical return measures described above, the final market-to-book value ratio and crediting rate at the end of a period may be attributed to market driven and cashflow driven factors. To do this, the entire process described above is repeated, but market-to-book value ratios and crediting rates replace total returns in the above stated relationships. For the case of market-to-book value ratio, this may be seen graphically in FIG. 7 by comparing the heights' of the four bars at the final date (Dec. 31, 2010). The first bar 7010 is the market-to-book value ratio of the stable value fund which would arise due to market-driven factors in isolation with no cashflows, $$\tilde{F}_{\frac{MV}{BV}}.$$

The second bar 7020 is the actual final market-to-book value ratio of the stable value fund with large withdrawals, $$F_{\frac{MV}{BV}}.$$

The third bar 7030 is the market-to-book value ratio of the Custom Benchmark which would arise due to market-driven factors in isolation with no cashflows, $$\tilde{B}_{\frac{MV}{BV}}.$$

The fourth bar 7040 is the actual final market-to-book value ratio of the Custom Benchmark with large withdrawals, $$B_{\frac{MV}{BV}}.$$

The difference between the market-to-book value ratio of the stable value fund and the Custom Benchmark $$\Delta_{\frac{MV}{BV}}$$

is the difference between the heights of the second bar 7020 and the fourth bar 7040. The portion of this market to book value difference due to market driven effects, $\Delta_{Market}$ is the difference between the heights of the first bar 7010 and the third bar 7030. The difference between market to book value ratios due to cashflow effects, $\Delta_{CF}$ is the difference between $$\Delta_{\frac{MV}{BV}}$$

and $\Delta_{Market}$.

Calculation Process for a Custom Benchmark as of a Date for a Specific Time Period The scope of the Custom Benchmark calculation described below relates to the Custom Benchmark of one stable value fund as of a particular end date for a specific retrospective time period defined by this end date and a particular starting date.

Figure 8:
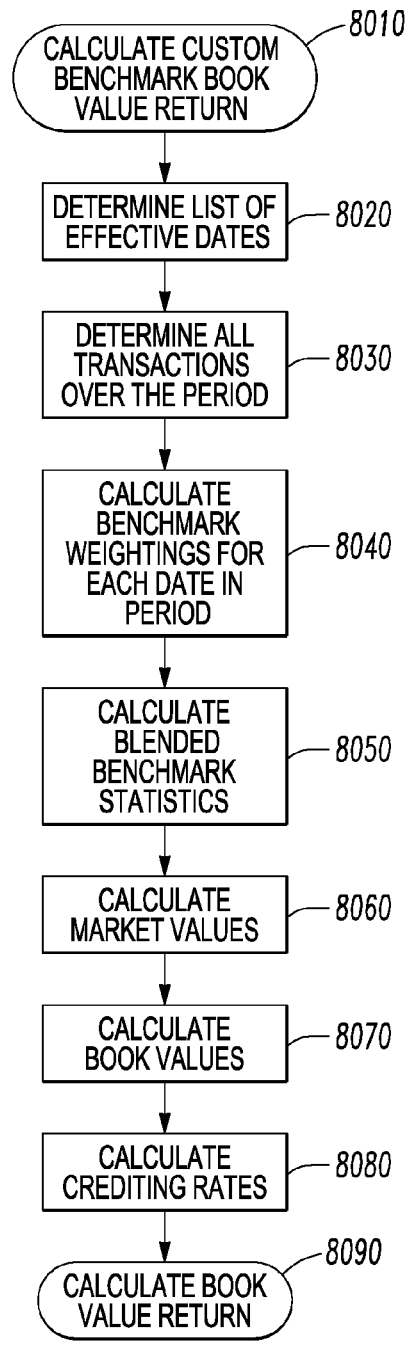
FIG. 8 shows the process flow to calculate a Custom Benchmark book value return.

FIG. 8 shows the process flow to calculate 8010 Custom Benchmark Book Value Return. For example, this calculation would apply to the 6-month Custom Benchmark for a given Client X's stable value fund as of Nov. 30, 2011. This 6-month Custom Benchmark return and end date market-to-book value ratio would provide a comparison to the stable value fund's return, and end date market-to-book value ratio over the time period from start date of May 31, 2011 to end date of Nov. 30, 2011. Due to the time-lag aspect of the crediting rate formula, this calculation will draw on data prior to the start date, going back to Apr. 30, 2011. As an example of what is not included within the scope of this calculation, the 6-month Custom Benchmark for Client X's stable value fund with an end date of Oct. 31, 2011 or the 3-month Custom Benchmark for Client X's stable value fund with an end date of Nov. 30, 2011 would be entirely distinct calculations to be performed separately by applying the same logic and some of the same underlying data to a different set of dates. If the stable value fund in question consists of multiple components, such as multiple wrap contracts, insurance separate account contracts, GICs, and/or cash instruments, the calculation below accounts for all of these components. If one or more of the wrap contract components encompasses more than one underlying bond fund then this calculation encompasses all of these underlying funds.

FIG. 8 shows the process flow to calculate 8010 Custom Benchmark Book Value Return. This process will first determine 8020 the list of effective month end dates (each "effective date") since the inception of the Custom Benchmark. Within the example of Client X's 6-month benchmark for Nov. 30, 2011, this list would consist of 4/30/2011, 5/31/2011, 6/30/2011, 7/31/2011, 8/31/2011, 9/30/2011, 10/31/2011, and 11/30/2011. The date corresponding to the beginning of the return period will be referred to as the "start date", which is 5/31/2011 in the current example.

In this process, for each effective date:

(a) if the effective date is greater than the start date (i.e. 6/30/2011, 7/31/2011, 8/31/2011, 9/30/2011, 10/31/2011, and 11/30/2011), the process will determine 8030 the full list of transactions for the stable value fund, for each component of the stable value fund, and for each underlying asset portfolio within each component of the stable value fund. These transactions will be applied to the Custom Benchmark, the corresponding components of the Custom Benchmark, and the corresponding underlying market value indices within each component of the Custom Benchmark. For a given month-end effective date, all transactions occurring within that month will be included;

(b) For all effective dates, calculate 8040 the weighting of all Custom Benchmark components and all market value indices held within each Custom Benchmark component. The weight of each market value index within each component is set to equal the weight of each corresponding underlying asset portfolio within the corresponding component of the stable value fund. The weight of each Custom Benchmark component is set to equal the weight of the corresponding component within the stable value fund. This step effectively rebalances the Custom Benchmark's asset allocation to reflect that of the fund on a monthly basis.

(c) For all effective dates, calculate 8050 the Custom Benchmark statistics: yield, duration, and Market Value return. These statistics are calculated for the overall Custom Benchmark, every Custom Benchmark component, and for every constituent market value index within each component. Duration and Yield are as of the effective date. Market value return ($MVR_C$) is the monthly return for the month which ends on the effective date. For each wrap or insurance separate account component, the yield and duration are calculated by taking a weighted average of these values of the underlying market indices using the weights calculated in 8040. For GIC and cash instrument components, the defined return, yield, and duration of with the associated benchmark are used. For the overall Custom Benchmark, the yield and duration are calculated by taking a weighted average of these values of each Custom Benchmark component using the weights calculated in 8040. For each component, the monthly return is calculated by taking a weighted average of the monthly return of each constituent market value index. If the effective date is greater than or equal to the start date, the weighting calculated in step 8040 for the prior effective date is used. If the effective date is less than the start date, the weighting calculated in step 8040 for the current effective date is used.

(d) For all effective dates calculate 8060 the market values of the Custom Benchmark, each component of the Custom Benchmark, and each constituent market value index within each component of the Custom Benchmark. (i) If the effective date is less than or equal to the start date (i.e. 4/30 or 5/31), the market value of the Custom Benchmark will be equal to the market value of the stable value fund. If the effective date is less than or equal to the start date, the market value of each component of the Custom Benchmark will be equal to the market value of the corresponding component in stable value fund. If the effective date is less than or equal to the start date, the market value of each market value index within each component of the stable value fund will be equal to the market value of the underlying asset portfolio within the corresponding component of the stable value fund. (ii) If the effective date is greater than the start date, the market values of the Custom Benchmark, each component of the Custom Benchmark, and each constituent market value index of each component of the Custom Benchmark is calculated by applying Equation 1 (below) to the benchmark component's market value 8060 from the prior effective date ($MV_P$), the component's corresponding market index's market return 8050 from the current effective date ($MVR_C$), and the component's transactions 8020 from the current period ($MVCF_C$):

$$MV_C = MV_P*(1+MVR_C) + MVCF_C/2*MVR_C + MVCF_C \quad \text{(Equation 1)}$$

The process calculates the overall market value of the Custom Benchmark by summing the market values of all of its constituent components.

(e) For all effective dates, the process will calculate the book values ($BV_C$) 8070 of the Custom Benchmark and each component of the Custom Benchmark. (i) If the effective date is less than or equal to the start date, the book value of the Custom Benchmark will be equal to the book value of the stable value fund. If the effective date is less than or equal to the start date, the book value of each component of the Custom Benchmark will be equal to the book value of the corresponding component in stable value fund. (ii) If the effective date is greater than the start date, the book value of each component of the Custom Benchmark is calculated by applying Equation 2 (below) to the component's book value from the prior effective date ($BV_P$), the current crediting rate ($CR_C$), and the component's transactions 8030 from the current period ($MVCF_C$). For wrap and insurance separate account components, $CR_C$ is taken from the output of step 8080 from two effective dates prior (i.e. $CR_C$ for 6/30 is taken from step 8080 for the 4/30 effective date). For GIC and cash components $CR_C$ is the monthly return calculated in step 8050 for the current effective date.

$$BV_C = BV_P*(1+CR_C)^{(1/12)} + BVCF_C/2*(CR_C/12) + BVCF_C \quad \text{(Equation 2)}$$

The process calculates the overall book value of the Custom Benchmark by summing the book values of all of its constituent components.

(f) For all effective dates, calculate crediting rates 8080 for the Custom Benchmark and each wrapped fixed income or insurance separate account component of the Custom Benchmark. This crediting rate will be applied to the determination of book values 8070 two effective dates later.

For the return period (e.g. 6 months within the example):
(a) the process will set the starting book value, market value for each component in the Custom Benchmark to be equal to that of the corresponding component in the stable value fund;
(b) the process will calculate the book value return 8090 for the Custom Benchmark by applying Equation 3 (below) to the output of steps 2a and 2d:

$$BVR_C = (BV_C - BV_P - NCF_C)/(BV_P + NCF_C) \quad \text{(Equation 3)}$$

The Hardware and Software Platform

The current version of the Custom Benchmark software was developed using PL/SQL running on an Oracle 11g Enterprise Edition database running in a Linux environment, but any modern programming language, database and operating system could be used. Any appropriate hardware platform may be used to hold and execute the software and data.

DEFINITIONS

The following definitions are used for the variables in the equations herein:
P=Previous month end period
C=Current month end
MV=Market Value
BV=Book Value
NCF=Net Cash Flow
MVR=Market Value Return
BVR=Book Value Return
MVCF=Market Value Cash Flow
BVCF=Book Value Cash Flow
CR=Crediting Rate
AEY=Annualized Yield
DUR=Effective Duration
ContractFees=Contract Fee on wrap contract or insurance separate account contract
DurationFactor=factor applied to duration when MV/BV ratio drops
InvMgmtFees=Investment Management fees
ADJ=catch-all field to allow for any miscellaneous adjustments to a crediting rate Calculations To summarize, the following equations are used herein:

$$MV_C = MV_P*(1+MVR_C) + MVCF_C/2*MVRC_C + MVCF_C \quad \text{(Equation 1)}$$

$$BV_C = BV_P*(1+CR_C)^{(1/12)} + BVCF_C/2*(CR_C/12) + BVCF_C \quad \text{(Equation 2)}$$

$$BVR_C = (BV_C - BV_P - NCF_C)/(BV_P + NCF_C) \quad \text{(Equation 3)}$$

Examples of Credit Rating Calculations

Various equations can be used to calculate the Credit Rating in various situations, as appropriate. Examples of some of the possible equations for calculating the Credit Rating are as follows:

$$((1+AEY)*(MV/BV)^{(1/DUR)}-1) - ContractFees \pm ADJ$$

$$(AEY+(MV-BV)/(MV*DUR)) - ContractFees \pm ADJ$$

$$((1+AEY)*(MV/BV)^{(1/DUR)}-1) \pm ADJ$$

$$(AEY+(MV-BV)/(MV*DUR)) \pm ADJ$$

$$((1+AEY)*(MV/BV)^{(1/(DUR*DurationFactor))}-1) - ContractFees \pm ADJ$$

$$(AEY+(MV-BV)/(MV*(DUR*DurationFactor))) - ContractFees \pm ADJ$$

$$((1+AEY)*(MV/BV)^{(1/(DUR*DurationFactor))}-1) \pm ADJ$$

$$(AEY+(MV-BV)/(MV*(DUR*DurationFactor))) \pm ADJ$$

$$((1+AEY)*(MV/BV)^{(1/DUR)}-1) - ContractFees \pm ADJ - InvMgmtFees$$

$$(AEY+(MV-BV)/(MV*DUR)) - ContractFees \pm ADJ - InvMgmtFees$$

$$((1+AEY)*(MV/BV)^{(1/DUR)}-1) \pm ADJ - InvMgmtFees$$

$$(AEY+(MV-BV)/(MV*DUR)) \pm ADJ - InvMgmtFees$$

$$((1+AEY)*(MV/BV)^{(1/(DUR*DurationFactor))}-1) - ContractFees \pm ADJ - InvMgmtFees$$

$$(AEY+(MV-BV)/(MV*(DUR*DurationFactor))) - ContractFees \pm ADJ - InvMgmtFees$$

$$((1+AEY)*(MV/BV)^{(1/(DUR*DurationFactor))}-1) \pm ADJ - InvMgmtFees$$

$$(AEY+(MV-BV)/(MV*(DUR*DurationFactor))) \pm ADJ - InvMgmtFees$$

$$(MV/BV)^{(1/DUR)}*(1+AEY) - ContractFees - 1$$

Operationally, the primary difference between the Custom Benchmark and all other prior benchmarks is the fact that the Custom Benchmark is unique to each client's stable value fund in that it incorporates client specific investment contract terms and cashflow events. Furthermore, the Custom Benchmark captures the amortization of gains and losses inherent in benefit responsive agreements which is characteristic of stable value funds, and allows for attribution between market-driven and client cashflow-driven factors described above.

The present invention is designed to work within the technology stack of a stable value fund manager as an enhancement to the management of the clients' stable value funds and a supplement to existing performance reporting. This environment provides the easiest implementation due to the fact that a large amount of data is required to perform the necessary calculations for the Custom Benchmark, including but not limited to a detailed accounting of all cashflows, underlying market portfolio data and market index data, and wrap contract data. There are at least two other applications of this process:

This process may be modified to enable Dwight or another agent to provide this analysis as a service to a third party asset manager, investment consultant, or plan sponsor. The modifications involve the establishment of detailed and robust data-feeds between the outside party and the service provider (e.g. Dwight).

This process may be incorporated into a piece of compiled software which may be deployed locally within a third party's technology stack, enabling them to use their own internal data to calculate Custom Benchmark returns, crediting rates, and market-to-book value ratios. Examples of such third parties include but are not limited to stable value plan sponsors, investment consultants, and stable value fund managers.

A variation of the present invention which would get substantially similar results would be a spreadsheet implementation, such as demonstrated by our spreadsheet prototype. It would be extremely challenging for this type of implementation to robustly and accurately handle the complexities associated with complex stable value funds containing multiple investment strategies and book value wrap contracts combined with detailed accounting of daily cashflow data.

Other Matters

The present invention requires data and calculations that practically speaking should be maintained and executed on a computer or computer system. Any appropriate computer hardware and software platform may be used, and the present invention is not limited to the hardware or software platform and components of any particular vendor, unless specified otherwise herein.

The calculations may be used for calculating a performance benchmark customized for a stable value fund invested in a number of strategy portfolios. The strategy portfolios may be wrapped in a number of wrap contracts, insurance separate account contracts, separate accounts, or other investments.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless or wireline varieties thereof, or any other computerized device capable of configuration for receiving, storing or processing data for standalone application or over a networked medium or media.

Computers and computer systems described herein may include operatively associated non-transitory computer-readable memory media, such as memory for storing software applications used in obtaining, processing, storing or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD compact disc, memory stick, ROM (read only memory), RAM (random access memory), PROM (programmable ROM), EEPROM (extended erasable PROM), or other like computer-readable media.

In general, non-transitory computer-readable memory media may include any medium capable of storage of an electronic signal representative of data stored, communicated or processed in accordance with embodiments of the present invention. Where applicable, method steps described herein may be embodied or executed as instructions stored on a non-transitory computer-readable memory medium or media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as constriction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, or parts may be made within the principle and scope of the invention without departing from the invention as described in the following claims.

Various components of embodiments of the invention may be implemented as software code to be executed by a processor of any computer system using any type of suitable computer instruction type. The software code may be stored as a series of instructions or commands on a non-transitory computer readable memory medium. The term "non-transitory computer-readable memory medium" as used herein may include, for example, magnetic and optical memory devices such as diskettes, compact discs of both read-only and writeable varieties, optical disk drives, and hard disk drives. A non-transitory computer-readable memory medium may also include memory storage that can be physical, virtual, permanent, temporary, semi-permanent or semi-temporary.

The methods may be implemented by any suitable type of hardware (e.g., device, computer, computer system, equipment, component), software (e.g., program, application, instruction set, code), storage medium (e.g., disk, device), propagated signal, or combination thereof.

Embodiments of the invention may be implemented utilizing any suitable computer languages (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. These software applications, or computer programs may be stored on a computer readable medium (e.g., disk, device), such that when a computer reads the medium, the functions described herein are performed.

In general, elements of embodiments may be connected through a network having wired or wireless data pathways. The network may include any type of delivery system including, but not limited to a local area network (e.g., Ethernet), a wide area network (e.g., the Internet and/or World Wide Web), a telephone network (e.g., analog, digital, wired, wireless, PSTN, ISDN, and/or xDSL), a packet-switched network, a radio network, a television network, a cable network, a satellite network, and/or any other wired or wireless communications network configured to carry data. The network may include elements, such as, for example, intermediate nodes, proxy services, routers, switches and adapters configured to direct or deliver data.

In general, elements of embodiments may include hardware or software components for communicating with the network and with each other. These elements may be structured and arranged to communicate through the network using various communication protocols (e.g., HTTP, TCP/IP, UDP, WAP, WiFi Bluetooth) or to operate within or in concert with one or more other communications systems.

Elements of embodiments may include one or more servers (e.g. IBM® operating system servers, Linux operating system-based servers, Windows NTT™ servers, Sybase) within the system.

A number of implementations of the present invention of the present invention have been described herein. Nevertheless, it will be understood that various modifications may be made and that other implementations are within the scope of the following claims.

What is claimed is:

1. A method using a computer for calculating a performance benchmark customized for a stable value fund, which fund is invested in a number of strategy portfolios, which portfolios are wrapped in a number of wrap contracts or insurance separate account contracts comprising:
   (a) calculating using the computer the return performance of the stable value fund, and the corresponding market-value-book-value ratio;
   (b) selecting an appropriate benchmark index for each strategy portfolio;
   (c) calculating using the computer a benchmark crediting rate for the customized performance benchmark, as if the stable value fund had been invested in the appropriate benchmark indexes instead of the actual strategy portfolios;
   (d) applying using the computer the benchmark crediting rate and appropriate benchmark index returns to calculate a custom return performance benchmark and corresponding market-value-book-value ratio; and
   (e) comparing the actual performance of the stable value fund to the performance of the customized performance benchmark, and comparing the stable value fund market-value-book-value ratio to the customized performance benchmark market-value-book-value ratio.

2. The method in claim 1 further comprising:
   calculating, using the computer, at one time, the custom return performance benchmark and corresponding market-value-book-value ratio, for a series of consecutive monthly periods.

3. The method in claim 1, wherein the crediting rate for the customized performance benchmark is calculated using the equation:

$$CR = (1+\text{Yield}) \times (MV/BV)^{(1/\text{Duration})} - 1$$

where CR is the crediting rate, Yield is the annualized yield of the underlying market-value investments, MV is the market value of the underlying investments, BV is the book value of the wrap or separate account, and, Duration is the duration of the underlying market-value investments.

4. The method in claim 1, wherein the benchmark crediting rate for the customized performance benchmark is calculated using an equation that is a member of the group comprising:

$$CR = ((1+AEY)*(MV/BV)^{(1/DUR)} - 1) - \text{ContractFees} \pm \text{ADJ}$$

$$CR = (AEY + (MV-BV)/(MV*DUR)) - \text{ContractFees} \pm \text{ADJ}$$

$$CR = ((1+AEY)*(MV/BV)^{(1/DUR)} - 1) \pm \text{ADJ}$$

$$CR = (AEY + (MV-BV)/(MV*DUR)) \pm \text{ADJ}$$

$$CR = ((1+AEY)*(MV/BV)^{(1/(DUR*\text{DurationFactor}))} - 1) - \text{ContractFees} \pm \text{ADJ}$$

$$CR = (AEY + (MV-BV)/(MV*(DUR*\text{DurationFactor}))) - \text{ContractFees} \pm \text{ADJ}$$

$$CR = ((1+AEY)*(MV/BV)^{(1/(DUR*\text{DurationFactor}))} - 1) \pm \text{ADJ}$$

$$CR = (AEY + (MV-BV)/(MV*(DUR*\text{DurationFactor}))) \pm \text{ADJ}$$

$$CR = ((1+AEY)*(MV/BV)^{(1/DUR)} - 1) - \text{ContractFees} \pm \text{ADJ} - \text{InvMgmtFees}$$

$$CR = (AEY + (MV-BV)/(MV*DUR)) - \text{ContractFees} \pm \text{ADJ} - \text{InvMgmtFees}$$

$$CR = ((1+AEY)*(MV/BV)^{(1/DUR)} - 1) \pm \text{ADJ} - \text{InvMgmtFees}$$

$$CR = (AEY + (MV-BV)/(MV*DUR)) \pm \text{ADJ} - \text{InvMgmtFees}$$

$$CR = ((1+AEY)*(MV/BV)^{(1/(DUR*\text{DurationFactor}))} - 1) - \text{ContractFees} \pm \text{ADJ} - \text{InvMgmtFees}$$

$$CR = (AEY + (MV-BV)/(MV*(DUR*\text{DurationFactor}))) - \text{ContractFees} + \text{ADJ} - \text{InvMgmtFees}$$

$$CR = ((1+AEY)*(MV/BV)^{(1/(DUR*\text{DurationFactor}))} - 1) \pm \text{ADJ} - \text{InvMgmtFees}$$

$$CR = (AEY + (MV-BV)/(MV*(DUR*\text{DurationFactor}))) \pm \text{ADJ} - \text{InvMgmtFees}$$

$$CR = (MV/BV)^{(1/DUR)} * (1+AEY) - \text{ContractFees} - 1$$

wherein the following definitions apply:
P=Previous month end period
C=Current month end
MV=Market Value
BV=Book Value
NCF=Net Cash Flow
MVR=Market Value Return
BVR=Book Value Return
MVCF=Market Value Cash Flow
BVCF=Book Value Cash Flow
CR=Crediting Rate
AEY=Annualized Yield
DUR=Effective Duration
ContractFees=Contract Fee on wrap contract or insurance separate account contract
DurationFactor=factor applied to duration when MV/BV ratio drops
InvMgmtFees=Investment Management fees
ADJ=catch-all field to allow for any miscellaneous adjustments to a crediting rate.

5. The method in claim 1, wherein the following equations are applied:

$$MV_C = MV_P*(1+MVR_C) + MVCF_C/2*MVRC_C + MVCF_C \quad \text{(Equation 1)}$$

$$BV_C = BV_P*(1+CR_C)^{(1/12)} + BVCF_C/2*(CR_C/12) + BVCFC \quad \text{(Equation 2)}$$

$$BVR_C = (BV_C - BV_P - NCF_C)/(BV_P + NCF_C) \quad \text{(Equation 3)}$$

Wherein the following definitions apply:
P=Previous month end period
C=Current month end
MV=Market Value
BV=Book Value
NCF=Net Cash Flow
MVR=Market Value Return
BVR=Book Value Return
MVCF=Market Value Cash Flow
BVCF=Book Value Cash Flow
CR=Crediting Rate
AEY=Annualized Yield
DUR=Effective Duration
ContractFees=Contract Fee on wrap contract or insurance separate account contract DurationFactor=factor applied to duration when MV/BV ratio drops
InvMgmtFees=Investment Management fees
ADJ=catch-all field to allow for any miscellaneous adjustments to a crediting rate.

6. A method using a computer for calculating a customized performance benchmark book value return for a stable value fund for a period, comprising:
   (a) determining a list of effective month end dates;
   (b) determining for each effective date all transactions over the period for the stable value fund and for each component of the stable value fund;
   (c) calculating using the computer benchmark weightings for each date in the period;
   (d) calculating using the computer blended benchmark statistics for each wrap component and for the overall customized performance benchmark as of each effective date;
   (e) calculating using the computer market values for each underlying market value index;
   (f) calculating using the computer current book values for each component of the customized performance benchmark;
   (g) calculating using the computer current crediting rates for each component; and
   (h) calculating using the computer the book value return for the customized performance benchmark.

7. The method in claim 6, wherein a benchmark crediting rate for the customized performance benchmark is calculated using an equation that is a member of the group comprising:

$$CR=((1+AEY)*(MV/BV)^{(1/DUR)}-1)-ContractFees \pm ADJ$$

$$CR=(AEY+(MV-BV)/(MV*DUR))-ContractFees \pm ADJ$$

$$CR=((1+AEY)*(MV/BV)^{(1/DUR)}-1) \pm ADJ$$

$$CR=(AEY+(MV-BV)/(MV*DUR)) \pm ADJ$$

$$CR=((1+AEY)*(MV/BV)^{(1/(DUR*DurationFactor))}-1)-ContractFees \pm ADJ$$

$$CR=(AEY+(MV-BV)/(MV*(DUR*DurationFactor)))-ContractFees \pm ADJ$$

$$CR=((1+AEY)*(MV/BV)^{(1/(DUR*DurationFactor))}-1) \pm ADJ$$

$$CR=(AEY+(MV-BV)/(MV*(DUR*DurationFactor))) \pm ADJ$$

$$CR=((1+AEY)*(MV/BV)^{(1/DUR)}-1)-ContractFees \pm ADJ-InvMgmtFees$$

$$CR=(AEY+(MV-BV)/(MV*DUR))-ContractFees \pm ADJ-InvMgmtFees$$

$$CR=((1+AEY)*(MV/BV)^{(1/DUR)}-1) \pm ADJ-InvMgmtFees$$

$$CR=(AEY+(MV-BV)/(MV*DUR)) \pm ADJ-InvMgmtFees$$

$$CR=((1+AEY)*(MV/BV)^{(1/(DUR*DurationFactor))}-1)-ContractFees \pm ADJ-InvMgmtFees$$

$$CR=(AEY+(MV-BV)/(MV*(DUR*DurationFactor)))-ContractFees+ADJ-InvMgmtFees$$

$$CR=((1+AEY)*(MV/BV)^{(1/(DUR*DurationFactor))}-1) \pm ADJ-InvMgmtFees$$

$$CR=(AEY+(MV-BV)/(MV*(DUR*DurationFactor))) \pm ADJ-InvMgmtFees$$

$$CR=(MV/BV)^{(1/DUR)}*(1+AEY)-ContractFees-1$$

wherein the following definitions apply:
P=Previous month end period
C=Current month end
MV=Market Value
BV=Book Value
NCF=Net Cash Flow
MVR=Market Value Return
BVR=Book Value Return
MVCF=Market Value Cash Flow
BVCF=Book Value Cash Flow
CR=Crediting Rate
AEY=Annualized Yield
DUR=Effective Duration
ContractFees=Contract Fee on contract
DurationFactor=factor applied to duration when MV/BV ratio drops
InvMgmtFees=Investment Management fees
ADJ=catch-all field to allow for any miscellaneous adjustments to a crediting rate.

8. The method in claim 6, wherein the following equations are applied:

$$MVC=MVP*(1+MVRC)+MVCF/2*MVRCC+MVCFC \quad \text{(Equation 1)}$$

$$BVC=BVP*(1+CRC)^{(1/12)}+BVCF/2*(CRC/12)+BVCFC \quad \text{(Equation 2)}$$

$$BVRC=(BVC-BVP-NCFC)/(BVP+NCFC) \quad \text{(Equation 3)}$$

Wherein the following definitions apply:
P=Previous month end period
C=Current month end
MV=Market Value
BV=Book Value
NCF=Net Cash Flow
MVR=Market Value Return
BVR=Book Value Return
MVCF=Market Value Cash Flow
BVCF=Book Value Cash Flow
CR=Crediting Rate
AEY=Annualized Yield
DUR=Effective Duration
ContractFees=Contract Fee on contract
DurationFactor=factor applied to duration when MV/BV ratio drops
InvMgmtFees=Investment Management fees
ADJ=catch-all field to allow for any miscellaneous adjustments to a crediting rate.

9. A computer system for calculating a performance benchmark customized for a stable value fund, which fund is invested in a number of strategy portfolios, which portfolios are wrapped in a number of wrap contracts, separate accounts or other investments, the computer system comprising:
   (a) a computer memory;
   (b) a programmable processor in electronic communication with the memory, the processor configured to execute the method comprising:
      (i) calculating using the computer the return performance of the stable value fund, and the corresponding market-value-book-value ratio;

(ii) selecting an appropriate benchmark index for each strategy portfolio;

(iii) calculating using the computer a benchmark crediting rate for the customized performance benchmark, as if the stable value fund had been invested, in the appropriate benchmark indexes instead of the actual strategy portfolios;

(iv) applying using the computer the benchmark crediting rate and appropriate benchmark index returns to calculate a custom return performance benchmark and corresponding market-value-book-value ratio; and (v) comparing the actual performance of the stable value fund to the performance of the customized performance benchmark, and comparing the stable value fund market-value-book-value ratio to the customized performance benchmark market-value-book-value ratio.

10. The computer system in claim 9, the processor further configured to execute the step comprising:

calculating, using the computer, at one time, the custom return performance benchmark and corresponding market-value-book-value ratio, for a series of consecutive monthly periods.

11. The computer system in claim 9, wherein the processor is further configured to calculate the crediting rate for the customized performance benchmark using the equation:

$$CR = (1 + \text{Yield}) \times (MV/BV)^{(1/\text{Duration})} - 1$$

where CR is the crediting rate, Yield is the annualized yield of the underlying market-value investments, MV is the market value of the underlying investments, BV is the book value of the wrap or separate account, and, Duration is the duration of the underlying market-value investments.

12. A computer system for calculating a customized performance benchmark book value return for a stable value fund for a period, the computer system comprising:

(a) a computer memory;

(b) a programmable processor in electronic communication with the memory, the processor configured to execute the method comprising:

(i) determining a list of effective month end dates;

(ii) determining for each effective date all transactions over the period for the stable value fund and for each component of the stable value fund;

(iii) calculating using the computer benchmark weightings for each date in the period;

(iv) calculating using the computer blended benchmark statistics for each wrap component and for the overall customized performance benchmark as of each effective date;

(v) calculating using the computer market values for each underlying market value index;

(vi) calculating using the computer current book values for each component of the customized performance benchmark;

(vii) calculating using the computer current crediting rates for each component; and (viii) calculating using the computer the book value return for the customized performance benchmark.

13. The method in claim 1, further comprising calculating and attributing, using the computer, the contributions to the performance of the customized performance benchmark between market performance of underlying investments and impact of client-driven cashflows.

14. The method in claim 13, wherein the contributions are calculated and attributed according to the equations:

$$P_{Total} = F_{ret} - B_{ret}$$

$$P_{Market} = \tilde{F}_{ret} - \tilde{B}_{ret}$$

$$P_{CF} = P_{Total} - P_{Market} = F_{ret} - B_{ret} - \tilde{F}_{ret} + \tilde{B}_{ret}$$

wherein $F_{ret}$ is the total return of the stable value fund over a period of time, $B_{ret}$ is the total return of the customized performance benchmark over the period of time, $\tilde{F}_{ret}$ is a modified total return of the stable value fund calculated omitting any influence of client-driven cashflows, $\tilde{B}_{ret}$ is a modified total return of the customized performance benchmark calculated omitting any influence of client-driven cashflows, $P_{Total}$ is the customized performance benchmark relative performance of the stable value fund, $P_{Market}$ is the customized performance benchmark relative performance of the stable value fund attributed to market performance of underlying investments, and $P_{CF}$ is the customized performance benchmark relative performance of the stable value fund attributed to client-driven cashflows.

15. The method of claim 13, wherein the contributions are calculated and attributed according to the equations:

$$\Delta_{\frac{MV}{BV}} = F_{\frac{MV}{BV}} - B_{\frac{MV}{BV}}$$

$$\Delta_{Market} = \tilde{F}_{\frac{MV}{BV}} - \tilde{B}_{\frac{MV}{BV}}$$

$$\Delta_{CF} = \Delta_{\frac{MV}{BV}} - \Delta_{Market}$$

wherein $$F_{\frac{MV}{BV}}$$

is the actual final market-to-book value ratio of the stable value fund, $$B_{\frac{MV}{BV}}$$

is the actual final market-to-book value ratio of the customized performance benchmark, $$\tilde{F}_{\frac{MV}{BV}}$$

is the market-to-book value ratio of the stable value fund due to market driven factors in isolation with no cashflows, $$\tilde{B}_{\frac{MV}{BV}}$$

is the market-to-book value ratio of the customized performance benchmark due to market driven factors in isolation with no cashflows, $\Delta_{\frac{MV}{BV}}$ is the market-to-book value difference between the stable value fund and the customized performance benchmark, and $\Delta_{Market}$ is the portion of $\Delta_{\frac{MV}{BV}}$ due to underlying market performance, and $\Delta_{CF}$ is the portion of $\Delta_{\frac{MV}{BV}}$ due to client-driven cashflows.

* * * * *